(No Model.)
W. C. BULL.
RIVET.
No. 547,988. Patented Oct. 15, 1895.
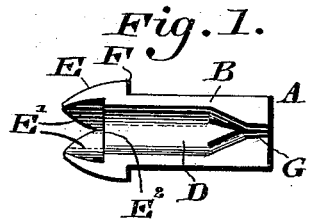
Fig. 1.
Fig. 2.
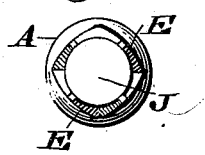
Fig. 3.
Fig. 4.
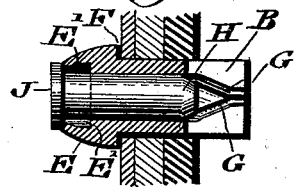
Fig. 5.
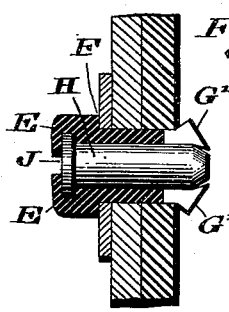
Fig. 6.
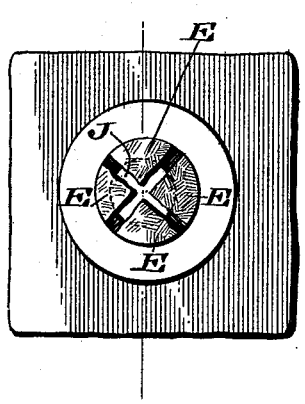
Fig. 7.
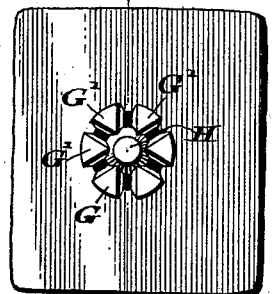
Fig. 8.
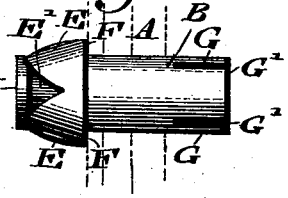
Fig. 5½.
WITNESSES:
P. H. Eagle.
L. Douville.
INVENTOR
William C. Bull
BY John A. Wiedersheim
ATTORNEY.

UNITED STATES PATENT OFFICE.

WILLIAM C. BULL, OF CAMDEN, NEW JERSEY, ASSIGNOR OF ONE-HALF TO DANIEL COOKE AND HERMAN C. PFEIL, OF SAME PLACE.

RIVET.

SPECIFICATION forming part of Letters Patent No. 547,988, dated October 15, 1895.

Application filed July 6, 1895. Serial No. 554,981. (No model.)

*To all whom it may concern:*

Be it known that I, WILLIAM C. BULL, a citizen of the United States, residing in the city and county of Camden, State of New Jersey, have invented a new and useful Improvement in Rivets, which improvement is fully set forth in the following specification and accompanying drawings.

My invention consists of a rivet for boiler and other purposes formed of a bushing and a pin adapted to be driven thereinto and expand the end of the said bushing against the wall of the opening the rivet occupies.

Figure 1 represents a side elevation of the inner face of a bushing embodying my invention. Fig. 2 represents a side elevation of the pin employed. Figs. 3 and 4 represent views of opposite ends of the device embodying my invention. Fig. 5 represents a longitudinal section of the device in primary condition in the plates to be riveted, said plates being shown in section. Fig. 5½ represents a side elevation thereof. Fig. 6 represents a section of the rivet in operative condition. Figs. 7 and 8 represent views of opposite ends of the same, the head of the pin or rivet proper in Fig. 7 appearing through the cross-shaped spaces of controlling-lips that are bent over said head.

Similar letters of reference indicate corresponding parts in the several figures.

Referring to the drawings, A designates a bushing, which is formed of suitable metal and consists of the cylindrical body B, having a recess D in its inner face, the lips E at one end, with the cavity E' and shoulder E² in said face, the shoulder F on the exterior face near said end, and the longitudinally-extending slits G in the other end, said slits forming segments G'. The recess D tapers or reduces in diameter at the end toward the slits G.

H designates a pin, which is freely located within the bushing and is provided with the head J, the latter being adapted to occupy the channel of the lips E and the shank or body to occupy the recess D, the point of the pin being somewhat tapering or conical.

The operation is as follows: The pin is placed in the bushing and the latter inserted in the opening in the plates of a boiler or other article to be riveted, as shown in Fig. 5, the shoulder F of the bushing contacting with the face of the contiguous plate around the opening therein. Then the pin H is driven into the bushing by blows on the head thereof, whereby as the point of the former comes in contact with the reduced portions of the recess D the segments G' of the bushing are spread apart radially and flared, so as to head or clinch and interlock with the face of the plate around the opening therein, further advance motion of the pin being limited by the contact of the head of the same with the shoulder E² on the inner face of the bushing. The lips E are now hammered down or otherwise clamped over the head of the pin, thus locking the latter within the bushing and preventing outward displacement thereof, it being seen that the bushing with its contained pin is firmly held within the openings in the plates by the shoulder F at one end and the flared segments G' at the other end, thus effectively riveting said plates. As the lips E are separated, spaces exist between the same, through which portions of the head of the pin appear; but said lips may be united as one and hammered over the peripheral portion of the head as a continuous rim. The bushing may be heated prior to insertion in the plate or inserted cold, as desired.

Having thus described my invention, what I claim as new, and desire to secure by Letters Patent, is—

1. In a rivet, a bushing adapted to receive a pin, and formed with segments at one end and lips at the other end, said segments being adapted to be spread-apart by said pin against the plate to be riveted, and said lips to be bent over the head of said pin, substantially as described.

2. A bushing having a recess therein, a channeled lip at one end and segments in the other end, and a pin adapted to enter said recess to flare said segments, and be engaged by said lip, substantially as described.

3. A bushing having therein a recess, one end of which is reduced, and the other end has a shoulder adjacent thereto, a channeled lip on one end and segments on the other end, said recess being adapted to receive a pin for spreading said segments, substantially as described.

4. A bushing having the shoulders F, and F' with lips E at one end, and the segments G at the other end, said segments having inclined portions on their inner faces, in combination with the headed pin having a tapering point, substantially as described.

WM. C. BULL.

Witnesses:
JOHN A. WIEDERSHEIM,
A. P. JENNINGS.